(12) United States Patent
Li (10) Patent No.: US 11,926,191 B2
(45) Date of Patent: Mar. 12, 2024

(54) ALL-TERRAIN VEHICLE

(71) Applicant: SEGWAY TECHNOLOGY CO., LTD., Changzhou (CN)

(72) Inventor: Xiang Li, Changzhou (CN)

(73) Assignee: SEGWAY TECHNOLOGY CO., LTD., Changzhou (CN)

( * ) Notice: Subject to any disclaimer, the term of this patent is extended or adjusted under 35 U.S.C. 154(b) by 0 days.

(21) Appl. No.: 17/962,114

(22) Filed: Oct. 7, 2022

(65) Prior Publication Data
US 2023/0110902 A1 Apr. 13, 2023

(30) Foreign Application Priority Data

Oct. 9, 2021 (CN) .......................... 202111173341.5
Oct. 9, 2021 (CN) ........................ 202122439071.X (51) Int. Cl.
*B60G 3/20* (2006.01)
*B60G 7/00* (2006.01)
(Continued)

(52) U.S. Cl.
CPC ............ *B60G 3/202* (2013.01); *B60G 7/001* (2013.01); *B60K 11/04* (2013.01); *B60G 15/062* (2013.01);
(Continued)

(58) Field of Classification Search
CPC ...... B60G 3/202; B60G 7/001; B60G 15/062; B60G 2200/144; B60G 2300/07;
(Continued)

(56) References Cited

U.S. PATENT DOCUMENTS

2009/0243248 A1* 10/2009 Nakamura ............... B60G 3/20
280/124.135
2014/0103627 A1 4/2014 Deckard et al.
(Continued)

FOREIGN PATENT DOCUMENTS

CN 104703866 A 6/2015
CN 109435620 A 3/2019
(Continued)

OTHER PUBLICATIONS

Hou, Feb. 2020, CN 210116349 U, Machine Translation of Specification.*

*Primary Examiner* — Paul N Dickson
*Assistant Examiner* — Matthew Joseph Ganci
(74) *Attorney, Agent, or Firm* — Emerson, Thomson & Bennett, LLC; Roger D. Emerson; Matt J. Wilson (57) ABSTRACT

An all-terrain vehicle is provided. The vehicle includes a lateral stabilizer bar and a shock absorber. The lateral stabilizer bar further includes a main bar, two side bars and ball-pin connecting rods. The side bars are connected to two sides of the main bar respectively and bent backward relative to the main bar, ends of the side bars are disposed on a suspension assembly, the main bar is disposed at the front end of a frame and located in front of a radiator, the ends of the two side bars are connected to the ball-pin connecting rods respectively, and the ball-pin connecting rods are disposed on the upper rocker arm. The side bars and the ball-pin connecting rods of the lateral stabilizer bar are located on an inner side of the shock absorber.

18 Claims, 5 Drawing Sheets

(51) Int. Cl.
  *B60G 15/06*    (2006.01)
  *B60K 11/04*    (2006.01)
(52) U.S. Cl.
  CPC .... *B60G 2200/144* (2013.01); *B60G 2300/07* (2013.01)
(58) Field of Classification Search
  CPC .... B60G 2204/1222; B60G 2204/1224; B60G 3/20; B60G 21/055; B60G 7/006; B60K 11/04; B60K 11/085; B60Y 2200/124; B60Y 2200/20
  See application file for complete search history.

(56) References Cited

U.S. PATENT DOCUMENTS

| | | | |
|---|---|---|---|
| 2018/0312025 A1 * | 11/2018 | Danielson | B60N 2/02 |
| 2018/0327038 A1 | 11/2018 | Battaglini et al. | |

FOREIGN PATENT DOCUMENTS

| | | | | |
|---|---|---|---|---|
| CN | 210116349 U | * | 2/2020 | |
| CN | 212667060 U | | 3/2021 | |
| GB | 677861 A | * | 7/1950 | ........... B60K 5/1216 |
| JP | 2006036039 A | | 2/2006 | |

* cited by examiner

ALL-TERRAIN VEHICLE

CROSS REFERENCE TO RELATED APPLICATIONS

The present disclosure claims priority to Chinese Application No. 202122439071.X filed on Oct. 9, 2021, and Chinese Application No. 202111173341.5 filed on Oct. 9, 2021, and entitled "ALL-TERRAIN VEHICLE", all of which are incorporated herein by reference in their entirety.

TECHNICAL FIELD

The present disclosure relates to the technical field of vehicles, in particular to an all-terrain vehicle.

BACKGROUND

With the development of science and technology and the improvement of people's living standards, all-terrain vehicles with good trafficability and driving fun are gradually recognized by people, and are gradually being popularized. In order to increase the control stability of an all-terrain vehicle, a stabilizer bar mechanism is usually disposed in a suspension system of the all-terrain vehicle to improve the driving stability of the all-terrain vehicle.

In related technologies, a rear stabilizer bar is generally disposed on the rear side of an all-terrain vehicle. The space at the front part of the all-terrain vehicle is limited, so a front stabilizer bar cannot be disposed at the front part of the all-terrain vehicle, or the unreasonable arrangement of the front stabilizer bar on the all-terrain vehicle will lead to poor stability of the all-terrain vehicle.

SUMMARY

The present disclosure aims to solve at least one of the technical problems in the prior art. In view of this, the present disclosure provides an all-terrain vehicle, in which a lateral stabilizer bar is disposed in front of a radiator at the front end of a frame, so the structure is stable and the mounting and dismounting are convenient.

An all-terrain vehicle according to an embodiment of the present disclosure includes: a plurality of ground-engaging members; a frame supported by the plurality of ground-engaging members; a cab supported by the frame; a radiator disposed at the front end of the frame; suspension assemblies connected to the left and right sides of the frame respectively and disposed opposite with respect to the radiator, each suspension assembly including an upper rocker arm and a lower rocker arm, the upper rocker arm being disposed above the lower rocker arm, the inner end of the upper rocker arm and the inner end of the lower rocker arm being connected to the frame; a lateral stabilizer bar including a main bar, two side bars and ball-pin connecting rods, the side bars being connected to two sides of the main bar respectively and bent backward relative to the main bar, the ends of the side bars being disposed on the suspension assembly, the main bar being disposed at the front end of the frame and located in front of the radiator, the ends of the two side bars being connected to the ball-pin connecting rods respectively, the ball-pin connecting rods being disposed on the upper rocker arm; and a shock absorber, the side bars and the ball-pin connecting rods of the lateral stabilizer bar being located on inner side of the shock absorber.

The main bar of the lateral stabilizer bar is disposed in front of the radiator, which can not only facilitate the mounting and dismounting of the main bar, but also improve the anti-torque performance of the front side of the frame, thereby improving the stability of the all-terrain vehicle.

According to some embodiments of the present disclosure, the bottom of the radiator is disposed on the frame, and the main bar is located in front of the bottom of the radiator.

According to some embodiments of the present disclosure, the lateral stabilizer bar is disposed at the front end of the frame and located above the upper rocker arm.

According to some embodiments of the present disclosure, each of the suspension assemblies further includes an upper rocker arm mounting bracket, the upper rocker arm mounting bracket is disposed at the front end of the frame, a main bar mounting seat is disposed on the upper rocker arm mounting bracket, the inner ends of the upper rocker arms of two said suspension assemblies are both disposed on the upper rocker arm mounting bracket, and the main bar is disposed on the main bar mounting seat.

According to some embodiments of the present disclosure, the main bar mounting seat includes a first mounting seat and a second mounting seat, the first mounting seat is disposed on the top of the upper rocker arm mounting bracket, the second mounting seat and the first mounting seat are disposed opposite and jointly define a mounting hole, and the main bar passes through the mounting hole.

According to some embodiments of the present disclosure, the main bar mounting seat further includes a bushing, the bushing is disposed in the first mounting seat and the second mounting seat and sleeved on the main bar, an oil hole is disposed in the bushing, an oil nozzle is disposed in one of the first mounting seat and the second mounting seat, and the oil nozzle is communicated with the oil hole.

According to some embodiments of the present disclosure, the main bar mounting seat includes fasteners, and the fasteners sequentially threaded the second mounting seat and the first mounting seat.

According to some embodiments of the present disclosure, a number of the main bar mounting seats is at least two, and the at least two main bar mounting seats are disposed at intervals on the upper rocker arm mounting bracket.

According to some embodiments of the present disclosure, the main bar is disposed horizontally and extends in the left-right direction, and each of the side bars obliquely extend rearward and downward from the connection between the side bar and the main bar.

According to some embodiments of the present disclosure, the outer end of the upper rocker arm is provided with a shock absorber mounting bracket, the shock absorber is disposed between the frame and the shock absorber mounting bracket, and the lower end of the ball-pin connecting rod is located between the inner end of the upper rocker arm and the shock absorber mounting bracket.

According to some embodiments of the present disclosure, the plane perpendicular to the front-rear direction is set as a first reference plane, and the projections of the side bars and the ball-pin connecting rods on the first reference plane are located between the projection of the radiator on the first reference plane and the projection of the shock absorber on the first reference plane.

According to some embodiments of the present disclosure, the all-terrain vehicle further includes a steering gear, the steering gear is disposed on the frame, the plane perpendicular to the left-right direction is set as a second reference plane, and the projection of the steering gear on the second reference plane is located in back of the projection of the shock absorber on the second reference plane.

According to some embodiments of the present disclosure, the projection of the radiator on the second reference plane is located in front of the projection of the ball-pin connecting rod on the second reference plane, and the projection of the ball-pin connecting rod on the second reference plane is located in front of the projection of the steering gear on the second reference plane.

According to some embodiments of the present disclosure, the upper rocker arm includes a first bar body, a second bar body and a mounting plate, the first bar body is located in front of the second bar body, the ends of the first bar body and the second bar body away from the frame are connected to each other, the ends of the first bar body and the second bar body close to the frame are spaced apart and connected to the frame, the mounting plate is disposed on the second bar body and the lower end of the ball-pin connecting rod is disposed on the mounting plate.

According to some embodiments of the present disclosure, the upper rocker arm further includes a ball pin mounting seat and a nut, the mounting plate is provided with a through hole, the ball pin mounting seat is disposed at the through hole, and the lower end of the ball-pin connecting rod passes through the ball pin mounting seat and is in threaded connection with the nut.

According to some embodiments of the present disclosure, the ball-pin connecting rod is disposed between the first bar body and the mounting plate.

According to some embodiments of the present disclosure, a reinforcing member is provided between the first bar body and the mounting plate; and/or a reinforcing flange is provided on the top of the mounting plate.

The lateral stabilizer bar is disposed at the front end of the bottom of the radiator, and the positions of the shock absorber, the steering gear and the suspension assemblies relative to the lateral stabilizer bar are reasonably set, which can not only make the setting of the lateral stabilizer bar simpler and more convenient, but also effectively improve the anti-torque performance of the lateral stabilizer bar, thereby improving the overall stability and reliability of the all-terrain vehicle.

Some of the additional aspects and advantages of the present disclosure will be provided in the following description, and some will become apparent from the following description, or be learned by practice of the present disclosure.

BRIEF DESCRIPTION OF THE DRAWINGS

The forgoing and/or additional aspects and advantages of the present disclosure will become apparent and readily appreciated from the following descriptions about embodiments with reference to the drawings.

REFERENCE NUMERALS

100—all-terrain vehicle;
70—ground-engaging member;
10—frame; 11—upper rocker arm mounting bracket; 111—main bar mounting seat; 1111—first mounting seat; 1112—second mounting seat; 1113—mounting hole; 1114—fastener; 12—bushing; 121—oil hole; 13—oil nozzle;
80—cab;
20—radiator;
30—suspension assembly; 31—upper rocker arm; 311—first bar body; 312—second bar body; 313—mounting plate; 3131—through hole; 3132—ball pin mounting seat; 3133—nut; 3134—reinforcing flange; 314—shock absorber mounting bracket; 315—reinforcing member; 32—lower rocker arm;
40—lateral stabilizer bar; 41—main bar; 42—side bar; 43—ball-pin connecting rod;
50—shock absorber; 60—steering gear.

DETAILED DESCRIPTION

Embodiments of the present disclosure will be described in detail below, and the embodiments described with reference to the drawings are exemplary. The embodiments of the present disclosure are described in detail below.

An all-terrain vehicle 100 according to an embodiment of the present disclosure will be described below with reference to FIG. 1 to FIG. 6.

Figure 1:
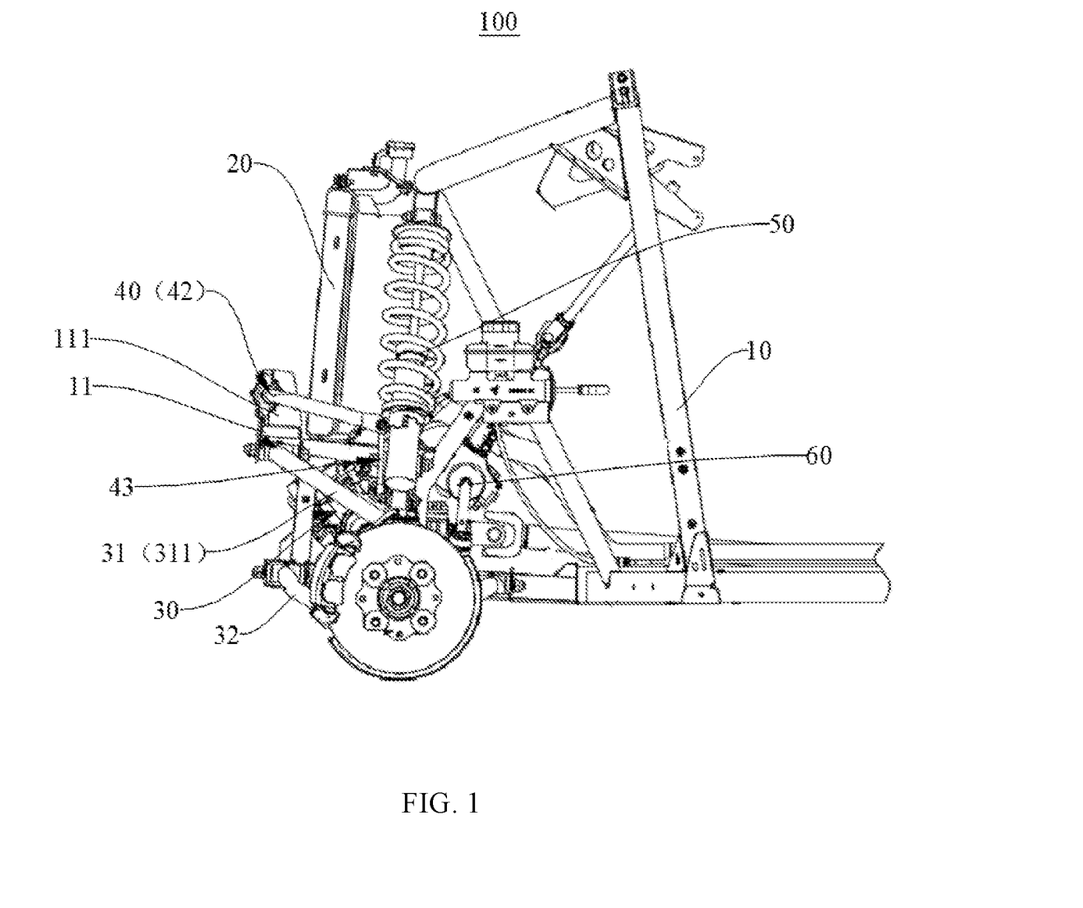
FIG. 1 is a schematic diagram of a part of an all-terrain vehicle according to an embodiment of the present disclosure.
Figure 2:
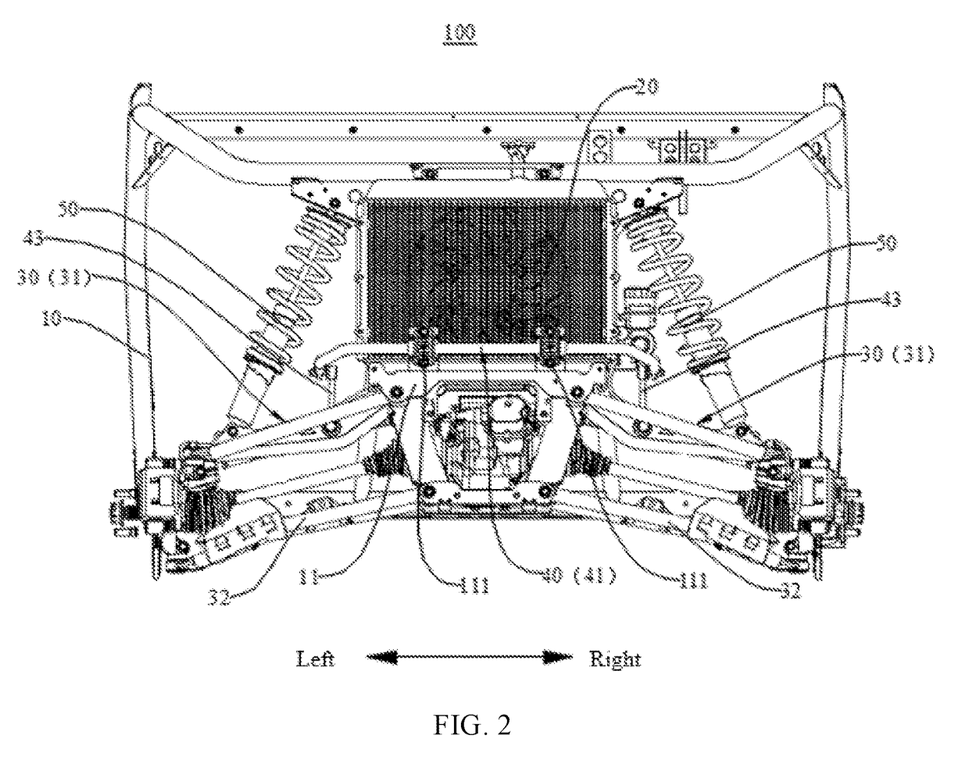
FIG. 2 is a schematic diagram of a part of the all-terrain vehicle according to an embodiment of the present disclosure.
Figure 3:
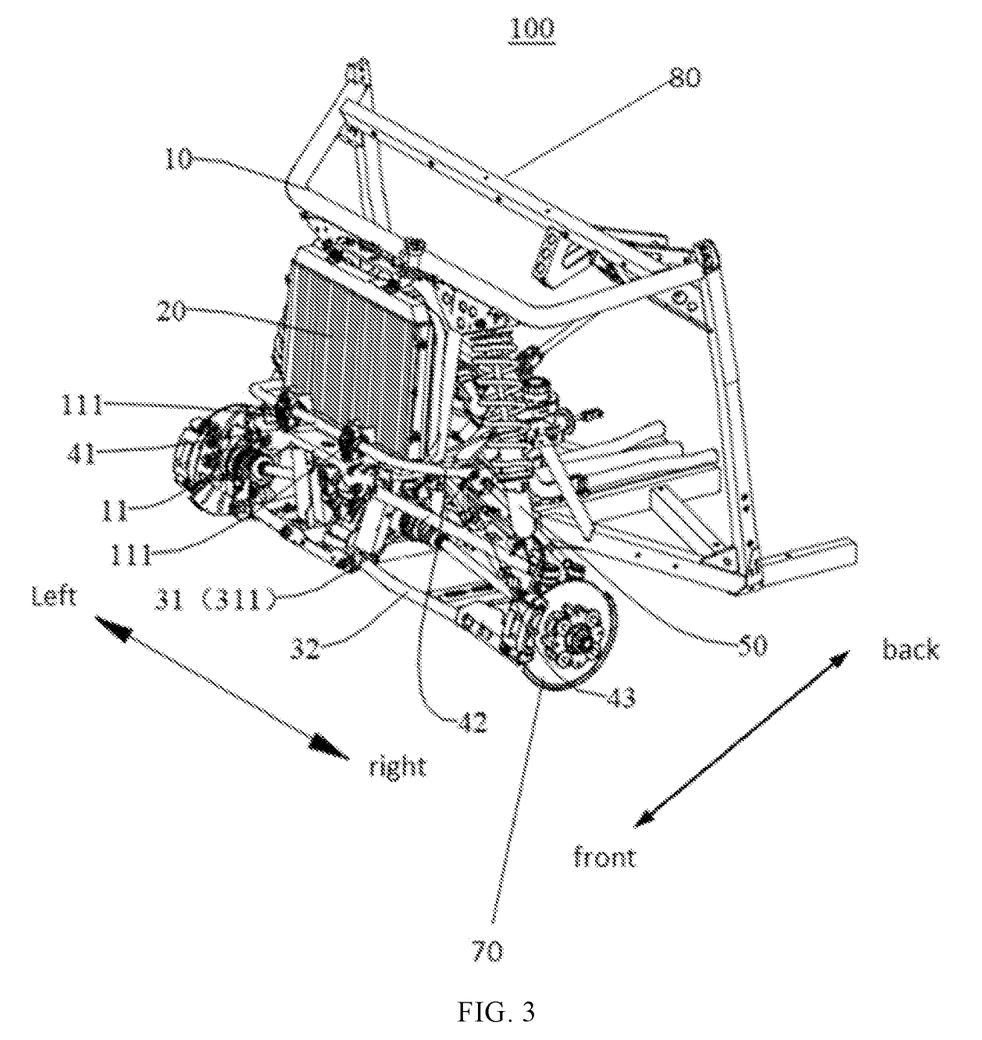
FIG. 3 is a schematic diagram of a part of the all-terrain vehicle according to an embodiment of the present disclosure.

With reference to FIG. 1 to FIG. 3, the all-terrain vehicle 100 according to the embodiment of the present disclosure may mainly include: a plurality of ground-engaging members 70, a frame 10, a cab 80, a radiator 20, suspension assemblies 30 and a lateral stabilizer bar 40. The frame 10 is supported by the plurality of ground-engaging members 70, and the cab 80 is supported by the frame 10, which can not only ensure the structural stability of the frame 10 and the cab 80, but also improve the overall reliability of the all-terrain vehicle 100.

The radiator 20 is disposed at the front end of the frame 10, and the suspension assemblies 30 are connected to the left and right sides of the frame 10 respectively and disposed opposite with respect to the radiator 20. The lateral stabilizer bar 40 may mainly include a main bar 41 and side bars 42, the side bars 42 are connected to two sides of the main bar 41 respectively and bent backward relative to the main bar 41, the ends of the side bars 42 are disposed on the suspension assemblies 30, and the main bar 41 is disposed at the front end of the frame 10 and located in front of the radiator 20.

Specifically, the side bars 42 are disposed on two sides of the main bar 41, one ends of the side bars 42 are connected to the end of the main bar 41, and the other ends are connected to the suspension assemblies 30, which can ensure the structural stability of the entire lateral stabilizer bar 40 mounted on the frame 10. In addition, when the suspension assemblies 30 absorb shock from the all-terrain vehicle 100, the lateral stabilizer bar 40 can improve the shock absorption performance of the suspension assemblies 30, so as to improve the overall stability of the all-terrain vehicle 100.

Further, the main bar 41 is disposed at the front end of the frame 10 and located in front of the radiator 20, which can not only make the structural design of the front side of the frame 10 more reasonable and facilitate the mounting and dismounting of the lateral stabilizer bar 40 on the front side of the frame 10, but also further improve the anti-torque performance of the suspension assemblies 30, thereby further improving the stability and reliability of the all-terrain vehicle 100.

The main bar 41 of the lateral stabilizer bar 40 is disposed in front of the radiator, which can not only facilitate the mounting and dismounting of the main bar 41, but also improve the anti-torque performance of the front side of the frame 10, thereby improving the stability of the all-terrain vehicle 100.

With reference to FIG. 1 to FIG. 3, the bottom of the radiator 20 is disposed on the frame 10, and the main bar 41 is located in front of the bottom of the radiator 20. Specifically, the main bar 41 is disposed in front of the bottom of the radiator 20, which can not only prevent the main bar 41 from affecting the mounting or dismounting of the radiator 20, but also further facilitate the mounting of the main bar 41, as well as further improve the anti-torque performance of the main bar 41 against the suspension assemblies 30, thereby improving the stability of the all-terrain vehicle 100.

With reference to FIG. 1 to FIG. 4, the suspension assembly 30 may mainly include an upper rocker arm 31 and a lower rocker arm 32, the upper rocker arm 31 is disposed above the lower rocker arm 32, and the lateral stabilizer bar 40 is disposed at the front end of the frame 10 and located above the upper rocker arm 31. Specifically, the upper rocker arm 31 is disposed above the lower rocker arm 32, and the lateral stabilizer bar 40 is disposed above the upper rocker arm 31, which can not only prevent the lateral stabilizer bar 40 from affecting the mounting of the upper rocker arm 31 and the lower rocker arm 32, but also improve the stability of the lateral stabilizer bar 40.

With reference to FIG. 1 to FIG. 4, the suspension assembly 30 may further mainly include an upper rocker arm mounting bracket 11, the upper rocker arm mounting bracket 11 is disposed at the front end of the frame 10, a main bar mounting seat 111 is disposed on the upper rocker arm mounting bracket 11, the inner ends of the upper rocker arms 31 of the two suspension assemblies 30 are both disposed on the upper rocker arm mounting bracket 11, and the main bar 41 is disposed on the main bar mounting seat 111. Specifically, the inner ends of the upper rocker arms 31 of the two suspension assemblies 30 are connected to the upper rocker arm mounting bracket 11, which can improve the stability of mounting of the upper rocker arms 31.

Further, the main bar mounting seat 111 is disposed on the upper rocker arm mounting bracket 11, and the main bar 41 is mounted on the main bar mounting seat 111, which can not only improve the stability of the main bar 41 mounted on the front side of the radiator 20, but also connect the main bar 41 with the suspension assemblies 30 more tightly, thereby further improving the stabilizing effect of the lateral stabilizer bar 40 on the suspension assemblies 30.

Figure 4:
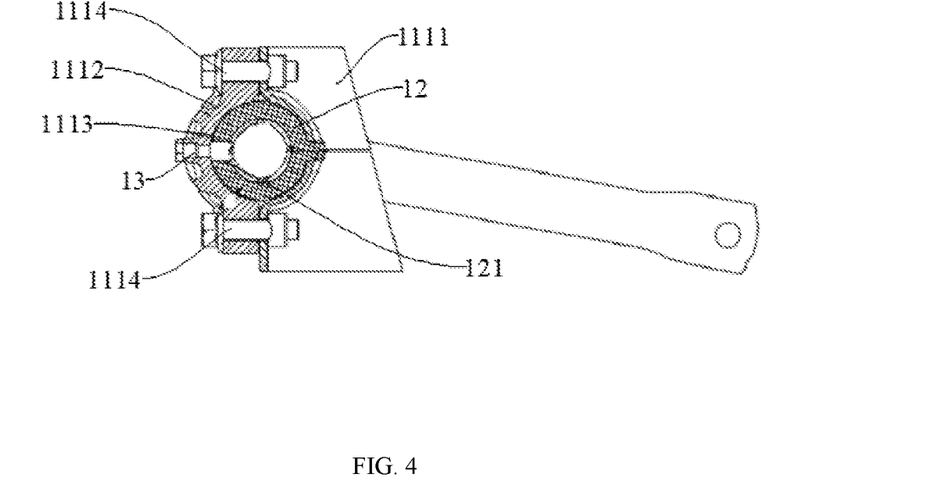
FIG. 4 is a cross-sectional view of a main bar mounting seat according to an embodiment of the present disclosure.

With reference to FIG. 4, the main bar mounting seat 111 may mainly include a first mounting seat 1111 and a second mounting seat 1112, the first mounting seat 1111 is disposed on the top of the upper rocker arm mounting bracket 11, the second mounting seat 1112 and the first mounting seat 1111 are disposed opposite and jointly define a mounting hole 1113, and the main bar 41 passes through the mounting hole 1113. Specifically, the first mounting seat 1111 and the second mounting seat 1112 are both disposed on the top of the upper rocker arm mounting bracket 11, the first mounting seat 1111 and the second mounting seat 1112 define the mounting hole 1113, and the main bar 41 passes through the mounting hole 1113, so that the main bar 41 can be stably and reliably disposed on the top of the upper rocker arm mounting bracket 11, which can further improve the rationality of the position of the main bar 41 and further optimize the structural design of the main bar 41.

With reference to FIG. 4, the main bar mounting seat 111 may further mainly include a bushing 12, the bushing 12 is disposed in the first mounting seat 1111 and the second mounting seat 1112 and sleeved on the main bar 41, an oil hole 121 is disposed in the bushing 12, an oil nozzle 13 is disposed in one of the first mounting seat 1111 and the second mounting seat 1112, and the oil nozzle 13 is communicated with the oil hole 121. Specifically, the bushing 12 is disposed in the first mounting seat 1111 and the second mounting seat 1112, so that the bushing 12 can buffer the main bar 41 passing through the mounting hole 1113, which can prevent the main bar 41 from bending damage in the mounting hole 1113 and improve the structural stability of the main bar 41.

Further, the oil nozzle 13 on one of the first mounting seat 1111 and the second mounting seat 1112 is communicated with the oil hole 121 on the bushing 12, so that oil in the oil nozzle 13 can enter the mounting hole 1113 through the oil hole 121 to play a lubricating protection role between the mounting hole 1113 and the main bar 41, which can not only make the mounting of the main bar 41 more stable to improve the structural reliability of the main bar 41, but also achieve better stabilizing performance of the main bar 41 on the suspension assembly 30, thereby further improving the stability and reliability of the lateral stabilizer bar 40.

With reference to FIG. 4, the main bar mounting seat 111 may mainly include fasteners 1114, and the fasteners 1114 sequentially threaded the second mounting seat 1112 and the first mounting seat 1111. Specifically, the fasteners 1114 sequentially threaded the first mounting seat 1111 and the second mounting seat 1112, which can not only connect the first mounting seat 1111 and the second mounting seat 1112 stably and reliably, but also facilitate the operation on the all-terrain vehicle 100 during mounting and production. The first mounting seat 1111 and the second mounting seat 1112 may be disposed opposite up and down, or may be disposed opposite front and back, and the positions of the first mounting seat 1111 and the second mounting seat 1111 can be selectively set according to different technological requirements of different all-terrain vehicles 100, which further facilitates the connection and fixation of the first mounting seat 1111 and the second mounting seat 1112.

With reference to FIG. 2 and FIG. 3, there are at least two main bar mounting seats 111, which are disposed at intervals on the upper rocker arm mounting bracket 11. Specifically, the at least two main bar mounting seats 111 are disposed at intervals on the upper rocker arm mounting bracket 11, which can further improve the uniform force on the main bar 41, thereby further improving the stability and reliability of mounting of the main bar 41.

As shown in FIG. 1, the main bar 41 is disposed horizontally and extends in the left-right direction, and each of the side bars 42 obliquely extend toward rearward and downward from the connection between the side bar 42 and the main bar 41. Specifically, the main bar 41 is disposed horizontally, and the side bars 42 obliquely extend rearward and downward from the main bar 41. In this way, when the all-terrain vehicle 100 is driven on a bumpy road and the suspension assemblies 30 stabilize the all-terrain vehicle 100, the side bars 42 directly connected to the suspension assemblies 30 will have a larger range of upward movement, thereby further improving the stabilizing performance of the lateral stabilizer bar 40 on the suspension assemblies 30.

With reference to FIG. 3, the central line of the main bar 41, which extends along the main bar 41, is located above the horizontal line at the bottom of the radiator 20.

With reference to FIG. 1 to FIG. 3, the suspension assembly 30 may mainly include an upper rocker arm 31 and a lower rocker arm 32, the upper rocker arm 31 is disposed above the lower rocker arm 32, the inner end of the upper rocker arm 31 and the inner end of the lower rocker arm 32 are both connected to the frame 10, the ends of the two side bars 42 are respectively connected with ball-pin connecting rods 43, and the ball-pin connecting rods 43 are disposed on the upper rocker arm 31. Specifically, the side bars 42 are disposed above the upper rocker arm 31, and the ball-pin connecting rods 43 on the side bars 42 are connected with the upper rocker arm 31, which can not only further improve the stability of connection between the side bars 42 and the ball-pin connecting rods 43, but also improve the stabilizing performance of the lateral stabilizer bar 40 on the suspension assemblies 30, thereby further improving the stability of the all-terrain vehicle 100.

With reference to FIG. 1 to FIG. 3, the all-terrain vehicle 100 may further mainly include a shock absorber 50, and the side bars 42 and the ball-pin connecting rods 43 of the lateral stabilizer bar 40 are all located on inner side of the shock absorber 50. Specifically, the side bars 42 and the ball-pin connecting rods 43 of the lateral stabilizer bar 40 are all disposed on inner side of the shock absorber 50, which can not only prevent the shock absorber 50 from being damaged by the contact collision with the side bars 42 and the ball-pin connecting rods 43 when the shock absorber 50 absorbs shock, thereby ensuring the reliability and stability of the shock absorber 50 and improving the anti-torque performance of the lateral stabilizer bar 40.

With reference to FIG. 1 to FIG. 3, the outer end of the upper rocker arm 31 is provided with a shock absorber mounting bracket 314, the shock absorber 50 is disposed between the frame 10 and the shock absorber mounting bracket 314, the shock absorber mounting bracket 314 is disposed closer to the outer end of the upper rocker arm 31 than the inner end of the upper rocker arm 31, and the lower end of the ball-pin connecting rod 43 is located between the inner end of the upper rocker arm 31 and the shock absorber mounting bracket 314. Specifically, the shock absorber 50 is disposed between the frame 10 and the shock absorber mounting bracket 314, and the shock absorber mounting bracket 314 is disposed close to the outer end of the upper rocker arm 31, which can not only improve the stability of mounting of the shock absorber 50, but also cause the shock absorber 50 to achieve a stable and reliable shock absorption effect on the all-terrain vehicle 100, thereby further improving the stability and reliability of the all-terrain vehicle 100.

Further, the lower end of the ball-pin connecting rod 43 is located between the inner end of the upper rocker arm 31 and the shock absorber mounting bracket 314, so that the ball-pin connecting rod 43 can make full use of the space between the upper rocker arm 31 and the shock absorber mounting bracket 314, and the mounting or dismounting of the ball-pin connecting rod 43 can be facilitated.

With reference to FIG. 1 to FIG. 3, the plane perpendicular to the front-rear direction is set as a first reference plane, and the projections of the side bars 42 and the ball-pin connecting rods 43 on the first reference plane are located between the projection of the radiator 20 on the first reference plane and the projection of the shock absorber 50 on the first reference plane. Specifically, the projections of the side bars 42 and the ball-pin connecting rods 43 on the first reference plane are located between the projection of the radiator 20 on the first reference plane and the projection of the shock absorber 50 on the first reference plane, which can not only further facilitate the mounting of the ball-pin connecting rods 43 and the side bars 42, but also improve the shock absorption performance of the ball-pin connecting rods 43 and the side bars 42 on the suspension assemblies 30, thereby further improving the stability and reliability of the all-terrain vehicle 100.

With reference to FIG. 1 to FIG. 3, the all-terrain vehicle 100 may further mainly include a steering gear 60, the steering gear 60 is disposed on the frame 10, the plane perpendicular to the left-right direction is set as a second reference plane, and the projection of the steering gear 60 on the second reference plane is located in back of the projection of the shock absorber 50 on the second reference plane. Specifically, the steering gear 60 can be connected to a steering wheel, and the steering gear 60 can transmit steering force to wheels, so as to realize the steering effect of the all-terrain vehicle 100. Further, the projection of the steering gear 60 on the second reference plane is located in back of the projection of the shock absorber 50 on the second reference plane, which can make the structural design of the all-terrain vehicle 100 more reasonable, improve the stability and reliability of the all-terrain vehicle 100, and prevent the setting of the lateral stabilizer bar 40 from affecting the mounting of the steering gear 60, thereby further optimizing the structural reliability of the all-terrain vehicle 100.

With reference to FIG. 1 to FIG. 3, the projection of the radiator 20 on the second reference plane is located in front of the projection of the ball-pin connecting rod 43 on the second reference plane, and the projection of the ball-pin connecting rod 43 on the second reference plane is located in front of the projection of the steering gear 60 on the second reference plane. Specifically, the projection of the radiator 20 on the second reference plane is located in front of the projection of the ball-pin connecting rod 43 on the second reference plane, and the projection of the ball-pin connecting rod 43 on the second reference plane is located in front of the steering gear 60 on the second reference plane, which can not only further facilitate the mounting of the ball-pin connecting rod 43, but also improve the shock absorption performance of the ball-pin connecting rod 43 and the side bar 42 on the suspension assembly 30, thereby further improving the stability and reliability of the all-terrain vehicle 100.

Figure 5:
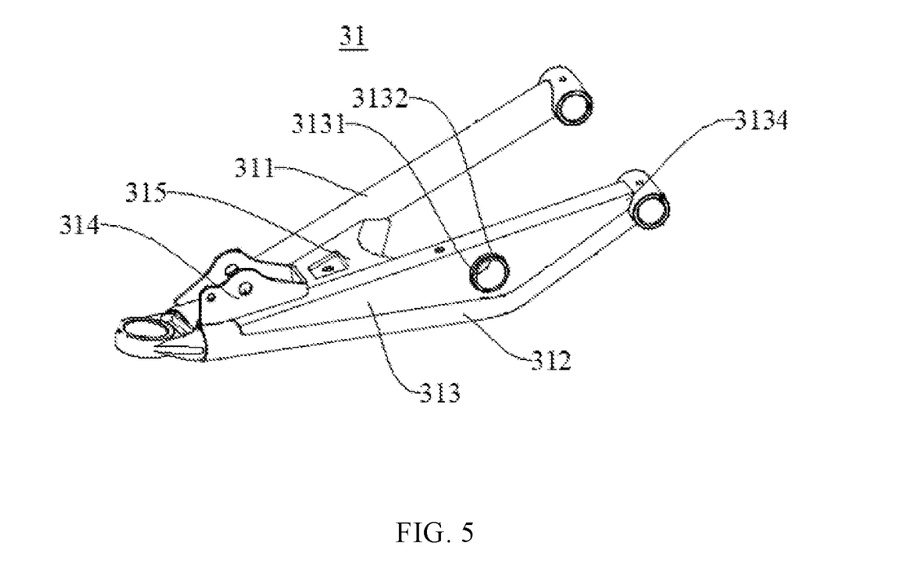
FIG. 5 is a schematic diagram of an upper rocker arm according to an embodiment of the present disclosure.

As shown in FIG. 5, the upper rocker arm 31 may mainly include a first bar body 311, a second bar body 312 and a mounting plate 313, the first bar body 311 is located in front of the second bar body 312, the outer end of the first bar body 311 and the outer end of the second bar body 312 are connected, the inner end of the first bar body 311 and the inner end of the second bar body 312 are spaced apart and connected to the frame 10, the mounting plate 313 is disposed on the second bar body 312, and the lower end of the ball-pin connecting rod 43 is disposed on the mounting plate 313. Specifically, the outer ends of the first bar body 311 and the second bar body 312 are connected, and the inner ends are spaced apart, so that after the inner ends of the first bar body 311 and the second bar body 312 are connected, the effect of improving the stability of the all-terrain vehicle 100 by the upper rocker arm 31 is better, and the reliability of the all-terrain vehicle 100 can be improved.

Further, the mounting plate 313 is disposed on the second bar body 312, and the ball-pin connecting rod 43 is disposed on the mounting plate 313, which can not only ensure the stability of mounting of the ball-pin connecting rod 43, but also improve the structural reliability of the second bar body 312.

Figure 6:
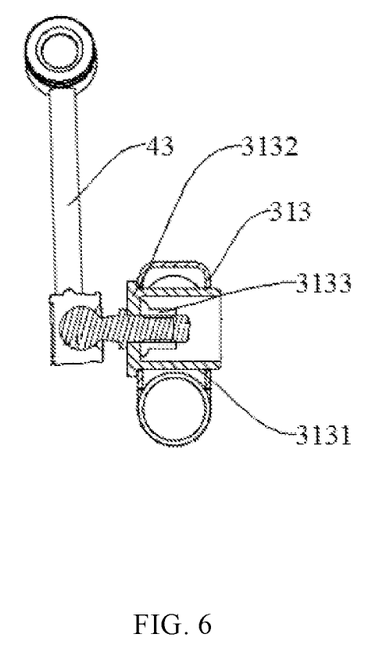
FIG. 6 is a partial cross-sectional view of a ball-pin connecting rod and a mounting plate according to an embodiment of the present disclosure.

With reference to FIG. 5 and FIG. 6, the upper rocker arm 31 may further mainly include a ball pin mounting seat 3132 and a nut 3133, the mounting plate 313 is provided with a through hole 3131, the ball pin mounting seat 3132 is disposed at the through hole 3131, and the lower end of the ball-pin connecting rod 43 passes through the ball pin mounting seat 3132 and is in threaded connection with the nut 3133. Specifically, the ball pin mounting seat 3132 is disposed at the through hole 3131, and the lower end of the ball-pin connecting rod 43, after passing through the ball pin mounting seat 3132, can be connected and fixed with the lower end of the ball pin mounting seat 3132 through the nut 3133, which can further improve the stability of mounting of the ball-pin connecting rod 43. In addition, there is no need to provide other mounting structures on the second bar body 312 and the mounting plate 313 to mount and connect the ball-pin connecting rod 43, which can further simplify the structure of the all-terrain vehicle 100 and optimize the structural design of the all-terrain vehicle 100.

As shown in FIG. 5, the ball-pin connecting rod 43 is disposed between the first bar body 311 and the mounting plate 313. Specifically, the ball-pin connecting rod 43 is disposed between the first bar body 311 and the mounting plate 313, so that the ball-pin connecting rod 43 can make full use of the space between the first bar body 311 and the mounting plate 313, the structure of the all-terrain vehicle 100 is more compact, and the stability of connection and fixation of the side bar 42 can be improved, thereby improving the reliability of the all-terrain vehicle 100.

As shown in FIG. 5, a reinforcing member 315 is provided between the first bar body 311 and the mounting plate 313, and a reinforcing flange 3134 is provided on the top of the mounting plate 313. Specifically, the reinforcing member 315 is provided between the first bar body 311 and the mounting plate 313, so that the connection between the first bar body 311 and the second bar body 312 can be more stable, and the overall structural strength of the upper rocker arm 31 can be improved. Further, the reinforcing flange 3134 is provided on the top of the mounting plate 313, which can further improve the structural strength of the mounting plate 313, thereby further improving the structural reliability of the upper rocker arm 31.

In the description of the present disclosure, it should be understood that the terms "center", "longitudinal", "transverse", "length", "width", "thickness", "upper", "lower", "front", "back", "left", "right", "vertical", "horizontal", "top", "inner", "outer", "clockwise", "anticlockwise", "axial", "radial", "circumferential", and the like indicate the orientations or positional relationships based on the orientations or positional relationship shown in the drawings. The terms are only for convenient description of the present disclosure and simplification of the description, but do not indicate or imply that the devices or elements referred to must have specific orientations or be constructed and operated in specific orientations. Therefore, the terms should not be understood to limit the present disclosure.

Reference throughout this specification to "an embodiment", "some embodiments", "an exemplary embodiment", "an example", "a specific example", "some examples", or the like means that a particular feature, structure, material, or characteristic described in connection with the embodiment or example is included in at least one embodiment or example of the present disclosure. Thus, the foregoing terms throughout this specification do not necessarily refer to the same embodiment or example of the present disclosure.

Although the embodiments of the present disclosure have been shown and described, it can be understood by those of ordinary skill in the art that various changes, modifications, substitutions and alterations can be made to these embodiments without departing from the principles and spirit of the present disclosure, and the scope of the present disclosure is defined by the claims and their equivalents.

What is claimed is:

1. An all-terrain vehicle comprising:
a plurality of ground-engaging members;
a frame supported by the plurality of ground-engaging members;
a cab supported by the frame;
a radiator disposed at a front end of the frame;
suspension assemblies connected to left and right sides of the frame respectively and disposed opposite with respect to the radiator, each of the suspension assemblies comprising an upper rocker arm and a lower rocker arm, the upper rocker arm being disposed above the lower rocker arm, an inner end of the upper rocker arm and an inner end of the lower rocker arm being connected to the frame;
a lateral stabilizer bar comprising a main bar, two side bars and ball-pin connecting rods, the side bars being connected to two sides of the main bar respectively and bent backward relative to the main bar, ends of the side bars being disposed on the suspension assembly, the main bar being disposed at the front end of the frame and located in front of the radiator in a direction of travel of the vehicle, the ends of the two side bars being connected to the ball-pin connecting rods respectively, the ball-pin connecting rods being disposed on the upper rocker arm; and
a shock absorber, the side bars and the ball-pin connecting rods of the lateral stabilizer bar being located on inner side of the shock absorber;
wherein each of the suspension assemblies further comprises an upper rocker arm mounting bracket, the upper rocker arm mounting bracket is disposed at the front end of the frame, a main bar mounting seat is disposed on the upper rocker arm mounting bracket, the inner ends of the upper rocker arms of two said suspension assemblies are both disposed on the upper rocker arm mounting bracket, and the main bar is disposed on the main bar mounting seat.

2. The all-terrain vehicle according to claim 1, wherein a bottom of the radiator is disposed on the frame, and the main bar is located in front of the bottom of the radiator.

3. The all-terrain vehicle according to claim 1, wherein the lateral stabilizer bar is disposed at the front end of the frame and located above the upper rocker arm.

4. The all-terrain vehicle according to claim 1, wherein the main bar mounting seat comprises a first mounting seat and a second mounting seat, the first mounting seat is disposed on a top of the upper rocker arm mounting bracket, the second mounting seat and the first mounting seat are disposed opposite and jointly define a mounting hole, and the main bar passes through the mounting hole.

5. The all-terrain vehicle according to claim 4, wherein the main bar mounting seat further comprises a bushing, the bushing is disposed in the first mounting seat and the second mounting seat and sleeved on the main bar, an oil hole is disposed in the bushing, an oil nozzle is disposed in one of the first mounting seat and the second mounting seat, and the oil nozzle is communicated with the oil hole.

6. The all-terrain vehicle according to claim 4, wherein the main bar mounting seat comprises fasteners, and the fasteners sequentially threaded the second mounting seat and the first mounting seat.

7. The all-terrain vehicle according to claim 1, wherein a number of the main bar mounting seats is at least two, and the at least two main bar mounting seats are disposed at intervals on the upper rocker arm mounting bracket.

8. The all-terrain vehicle according to claim 1, wherein the main bar is disposed horizontally and extends in a left-right direction, and each of the side bars obliquely extend rearward and downward from the connection between the side bar and the main bar.

9. The all-terrain vehicle according to claim 1, wherein an outer end of the upper rocker arm is provided with a shock absorber mounting bracket, the shock absorber is disposed between the frame and the shock absorber mounting bracket, and a lower end of the ball-pin connecting rod is located between the inner end of the upper rocker arm and the shock absorber mounting bracket.

10. The all-terrain vehicle according to claim 9, wherein a plane perpendicular to a front-rear direction is set as a first reference plane, and projections of the side bars and the ball-pin connecting rods on the first reference plane are located between a projection of the radiator on the first reference plane and a projection of the shock absorber on the first reference plane.

11. The all-terrain vehicle according to claim 9, further comprising a steering gear disposed on the frame, wherein a plane perpendicular to a left-right direction is set as a second reference plane, and a projection of the steering gear on the second reference plane is located in back of a projection of the shock absorber on the second reference plane.

12. The all-terrain vehicle according to claim 11, wherein a projection of the radiator on the second reference plane is located in front of a projection of the ball-pin connecting rod on the second reference plane, and a projection of the ball-pin connecting rod on the second reference plane is located in front of the projection of the steering gear on the second reference plane.

13. The all-terrain vehicle according to claim 1, wherein the upper rocker arm comprises a first bar body, a second bar body and a mounting plate, the first bar body is located in front of the second bar body, ends of the first bar body and the second bar body away from the frame are connected to each other, ends of the first bar body and the second bar body close to the frame are spaced apart and connected to the frame, the mounting plate is disposed on the second bar body and a lower end of the ball-pin connecting rod is disposed on the mounting plate.

14. The all-terrain vehicle according to claim 13, wherein the upper rocker arm further comprises a ball pin mounting seat and a nut, the mounting plate is provided with a through hole, the ball pin mounting seat is disposed at the through hole, and the lower end of the ball-pin connecting rod passes through the ball pin mounting seat and is in threaded connection with the nut.

15. The all-terrain vehicle of claim 13, wherein the ball-pin connecting rod is disposed between the first bar body and the mounting plate.

16. The all-terrain vehicle according to claim 13, wherein a reinforcing member is provided between the first bar body and the mounting plate.

17. The all-terrain vehicle according to claim 13, wherein a reinforcing flange is provided on a top of the mounting plate.

18. The all-terrain vehicle according to claim 1, wherein a central line of the main bar is located above a horizontal line at a bottom of the radiator.

* * * * *